F. F. STAUFFER.
CRANK ROD BEARING.
APPLICATION FILED APR. 20, 1911.
1,046,889.
Patented Dec. 10, 1912.
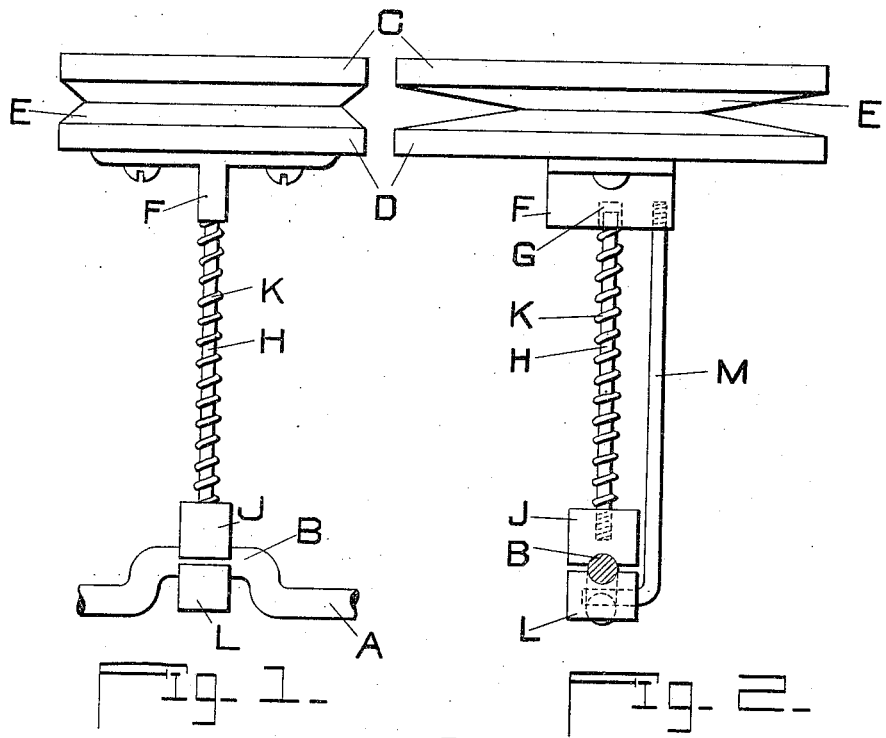
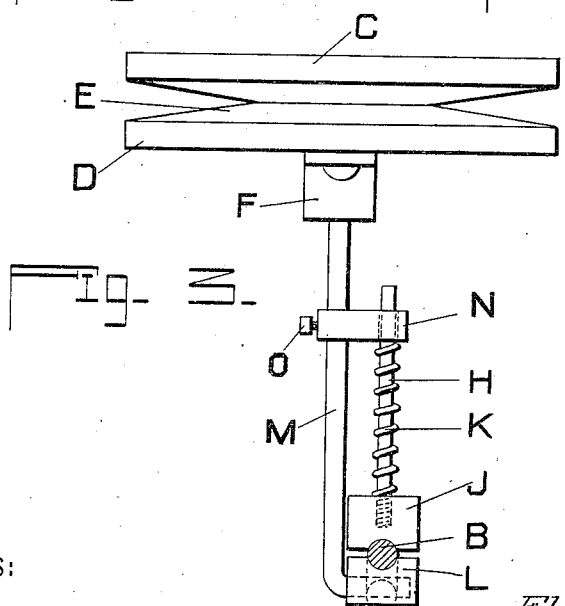
WITNESSES:
INVENTOR
Floyd F. Stauffer.
BY
ATTORNEYS

UNITED STATES PATENT OFFICE.

FLOYD F. STAUFFER, OF DALLAS, TEXAS, ASSIGNOR OF ONE-HALF TO WILLIAM J. GLYNN, OF DALLAS, TEXAS.

CRANK-ROD BEARING.

1,046,889.

Specification of Letters Patent. Patented Dec. 10, 1912.

Application filed April 20, 1911. Serial No. 622,329.

*To all whom it may concern:*

Be it known that I, FLOYD F. STAUFFER, a citizen of the United States, residing at Dallas, in the county of Dallas and State of Texas, have invented certain new and useful Improvements in Crank-Rod Bearings, of which the following is a specification.

My invention relates to new and useful improvements in crank rod bearings, and relates more particularly to an improvement in the crank rod bearings of a rotary bellows pump, such as are commonly used in automatic pianos.

The object of the invention is to provide a crank rod bearing that will always fit closely to the crank, means being provided to compensate for the wear, which tends to produce a loose bearing after a considerable period of operation.

The object is more specifically to provide a crank rod bearing consisting of two spaced members, one of which maintains a fixed relation to the crank rod, while the other is acted upon by a spring, which produces a constant close contact, and prevents a loose fit due to wear.

Finally the object of the invention is to provide a crank rod bearing that will be strong, durable, simple, and efficient, and comparatively easy to construct, and one that will operate noiselessly for a long period of time and with little friction.

With these and various other objects in view, my invention has relation to certain novel features of the construction and operation, an example of which is described in the following specification, and illustrated in the accompanying drawing, wherein:

Figure 1 is a front view of a crank, and a crank rod connecting therewith through the bearing herein described, and serving to operate a bellows, the latter being shown in its compressed condition. Fig. 2 is a side elevation of the same. Fig. 3 is a view in side elevation, showing a somewhat modified form of the invention, means being provided to readily adjust the pressure acting upon the adjustable member of the bearing.

Referring now more particularly to the drawing wherein like letters of reference designate similar parts in all the figures, the letter A denotes a crank shaft, and B the crank therein. The rotation of the crank B is employed to operate a pneumatic bellows, consisting of a stationary upper member C, and a movable lower member D, the two being connected by a fabric E, which forms an air receptacle within the bellows. A T shaped bracket F, having an aperture G extending upwardly into its vertical portion, is centrally mounted upon the bellows member D. The aperture G receives the upper extremity of a rod H, which has its lower extremity threaded into a bearing member J, receiving the upper half of the crank B. A spring K is coiled upon the rod H and has its extremities abutting against the bracket F, and the bearing member J respectively, the latter being held in constant contact with the crank B by the action of said spring. The lower half of the bearing is formed by a member L, which is held in the proper position relative to the member J by a rod M, the upper extremity of which is threaded into the bracket F, and the lower extremity bent at a right angle, and extended into said member L, holding the same in a rigid relation to the bracket F.

From the above description it is apparent that a rotation of the crank B will produce a vertically reciprocating motion of the bellows member D, the latter at the same time undergoing a rocking or oscillating motion. A sufficient space will intervene between the bearing members J and L to allow the former to approach the latter as the bearing gradually wears.

In the modified form of the invention shown in Fig. 3, the vertical rod H is made somewhat shorter, and has not connection directly with the bracket F. The upper extremity of said rod passes loosely through an aperture in a block N, which block is clamped upon the rod M by means of a set screw O. This arrangement permits adjustment of the amount of compression in the spring K, since by loosening the set screw O, the block N may be moved up and down upon the rod M as described.

When the above described crank rod bearing is used as part of a rotary bellows pump mechanism, the preferable material for the bearing members will be hard fiber. It is obvious, however, that the application of the device is not limited to rotary bellows pumps, and the invention is, therefore, presented as including all applications and modifications that are within the scope of the following claims.

What I claim is:

1. In a device of the character described, the combination with a crank, of a pair of bearing members, slightly spaced, engaging the wrist of the crank, two spaced parallel rods one of which is perpendicular to the wrist of the crank and rigidly attached to the bearing member, and the other is provided with a bent extremity rigidly attached to the other bearing member, a compressed spring coiled upon that rod which is perpendicular to the wrist pin, and having one end resting upon the bearing member to which said rod is attached, means rigidly connected with the other rod, maintaining the compression of the spring, and a body attached to the free end of the last-named rod, and adapted to receive a reciprocating motion therefrom.

2. In a device of the character described, the combination with a crank, of a pair of bearing members, slightly spaced, engaging the wrist of the crank, two spaced parallel rods one of which is perpendicular to the wrist of the crank, and rigidly attached to one bearing member, and the other is provided with a bent extremity rigidly attached to the other bearing member, a body adapted to receive a reciprocating motion from the crank through the last specified rod, a bracket rigidly secured to said body to which bracket said rod has rigid connection, a socket being provided in said bracket in which the free end of the rod perpendicular to the crank wrist is received, and a spring coiled upon the last specified rod having one end resting upon the correlated bearing member and the other upon the bracket.

In testimony whereof I have signed my name to this specification in the presence of two subscribing witnesses.

FLOYD F. STAUFFER.

Witnesses:
J. T. MURRAY,
L. MORRIS.

---

Copies of this patent may be obtained for five cents each, by addressing the "Commissioner of Patents, Washington, D. C."